(12) United States Patent
Ramalingam et al.

(10) Patent No.: US 8,165,403 B1
(45) Date of Patent: Apr. 24, 2012

(54) METHOD AND SYSTEM FOR DETERMINING POSES OF SPECULAR OBJECTS

(75) Inventors: Srikumar Ramalingam, Cambridge, MA (US); Ashok Veeraraghavan, Cambridge, MA (US); Yuichi Taguchi, Cambridge, MA (US); Cuneyt Oncel Tuzel, Cambridge, MA (US); Nitesh Shroff, Greenbelt, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 33 days.

(21) Appl. No.: 12/950,357

(22) Filed: Nov. 19, 2010

(51) Int. Cl.
*G06K 9/46* (2006.01)
*H04N 5/04* (2006.01)
*G05B 19/18* (2006.01)
(52) U.S. Cl. .................. 382/190; 348/511; 700/62
(58) Field of Classification Search .......... 382/190, 382/198, 291; 348/94, 169, 170, 171, 172, 348/370, 511; 700/62, 245, 248, 900
See application file for complete search history.

(56) References Cited

U.S. PATENT DOCUMENTS

| 7,711,182 | B2 * | 5/2010 | Beardsley | 382/154 |
| 7,764,838 | B2 * | 7/2010 | Jolly et al. | 382/190 |

* cited by examiner

*Primary Examiner* — Abolfazl Tabatabai
(74) *Attorney, Agent, or Firm* — Dirk Brinkman; Gene Vinokur

(57) ABSTRACT

A pose of an object is determine by acquiring sets of images of the object by a camera, wherein the object has a thread arranged on a surface such that a local region of the object appears substantially spherical, wherein the camera is at a different point of view for each set, and wherein each image in each set is acquired while the scene is illuminated from a different direction. A set of features is extracted from each image, wherein the features correspond to points on the surface having normals towards the camera. A parametric line is fitted to the points for each image, wherein the line lies on a plane joining a center of the camera and an axis of the object. Then, geometric constraints are applied to lines to determine the pose of the object.

15 Claims, 7 Drawing Sheets

200

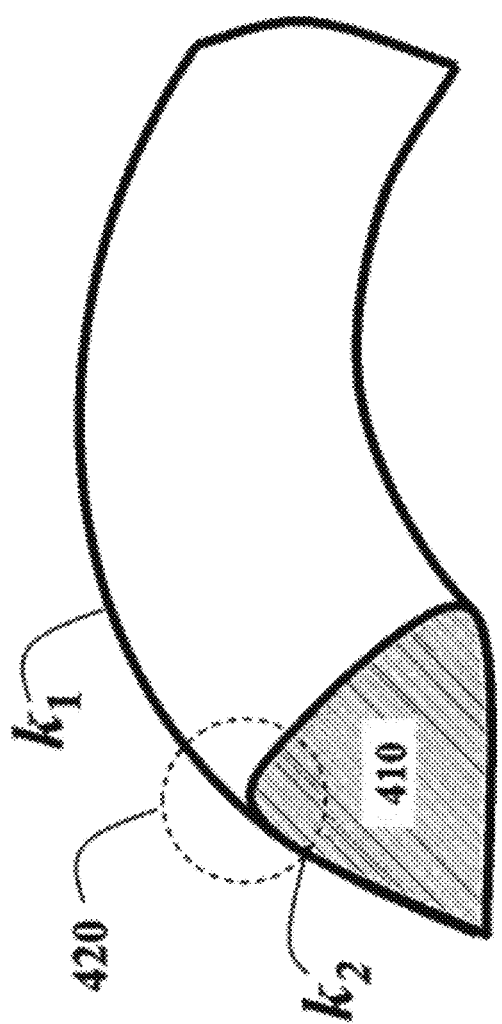

METHOD AND SYSTEM FOR DETERMINING POSES OF SPECULAR OBJECTS

FIELD OF THE INVENTION

This invention relates generally to determining poses of objects, and more particular to objects that are specular, substantially cylindrical and have thread on such as screws and bolts.

BACKGROUND OF THE INVENTION

Computer vision systems and methods are frequently used to automate assembly tasks, such as performed by industrial robots. However, small, shiny or specular objects, which are common in many industrial environments, still present a great challenge for computer vision applications. Objects with mirror-like, transparent or translucent surfaces possess material properties that are frequently treated as noise sources, and conventional techniques attempt to suppress the noise. This means that objects which are either highly specular or have significant translucency cannot be handled by conventional computer vision techniques because it is difficult to suppress these material.

Computer vision has been used for bin picking, where the main problem is to determine a pose of an object and in a bin of identical objects. As defined herein, the 6D pose is the 3D position and 3D orientation of the object. Development of computer vision systems is a challenge because of specular reflections of metallic surfaces of industrial parts, and occlusions in a cluttered bin of many identical objects.

Model-based pose estimation determines 3D model to 2D image correspondences. Unfortunately, 3D-2D point correspondences are hard to obtain for industrial parts with textureless surfaces. The situation is particularly severe when multiple identical objects overlap each other in a bin and occlusions can occur.

Object contours provide rich information about object shapes and poses. Various contour matching methods are known. However, for specular objects, the contour information is difficult to obtain in a cluttered bin because the objects do not have appearance of their own in images, but rather the objects reflect the surrounding environment.

Range sensors are widely used for the pose estimation problem. Range data can be used to generate and verify object positions and shape of flexible industrial parts, such as cables. However in the presence of specularities, range sensors fail to produce accurate depth maps, and are comparably more expensive than camera based solutions.

Active illumination patterns can greatly assist computer vision methods. For example, the brightness of patches observed with varying illumination condition can be used to the estimate orientation of surface patches, and then matches them with the 3D model.

As stated above, specularities have generally been treated as sources of noise in machine vision methods. Most methods identify specularities and remove them as noise.

One image invariant method for highly specular and mirror-like surfaces exploits the fact that the surface normals do not change at regions of zero-curvature. For most industrial objects, this is not a very practical feature because the objects are typically made up of several planar surfaces and some corners, and the distinctive information about these objects is present at these corners and junctions.

SUMMARY OF THE INVENTION

The embodiments of the invention provide a method and system for identifying 3D objects and their 6D poses from 2D images. The method and system can be used for computer vision aided robotic assembly. Specifically, the objects are highly specular, or mirror-like.

If an illumination source moves, then specular highlights move by a distance that is inversely proportional to a curvature of a surface. This enables us to extract these regions and use the regions as features of the objects.

We use a multi-flash camera (MFC) as the moving illumination source. When images from multiple points of view are acquired, we can triangulate and obtain the 6D poses of the objects. In a robotic system with a gripper arm, we can perform automated detection and pose estimation of shiny screws or bolts within a cluttered bin, achieving position and orientation errors less than 0.5 mm and 0.8°, respectively.

In an example application, the objects are small metallic screws in a cluttered bin. Screws form a most fundamental class of objects used in many manufacturing processes. More threaded screws are produced each year than any other machine part.

In conventional assembly lines, the screws are placed at a known pose in a part holder and a robot gripper manipulates the screws. This operation requires either a specially designed hardware for each screw type such as a part feeder, or performed manually.

The majority of screws are metallic and shiny, and therefore, they cannot be handled easily by conventional machine vision methods. In addition, pose estimation of a screw in a bin is a very challenging problem because of clutter and occlusions. With our method specular features of the object can be extracted from images of the cluttered bin. We estimate the poses of the screws by matching the features from the same screw in multiple images. This matching is particularly difficult because the entire bin contains many instances of the same screw in a wide variety of poses. To solve this problem, we use the rank-2 constraint from the dependency of three planes intersecting in a single line to establish correspondences and triangulation for pose estimation.

BRIEF DESCRIPTION OF THE DRAWINGS

FIG. 4D is a cross-section of a portion of a thread according to embodiments of the invention.

DETAILED DESCRIPTION OF THE PREFERRED EMBODIMENT

System Overview

Figure 1:
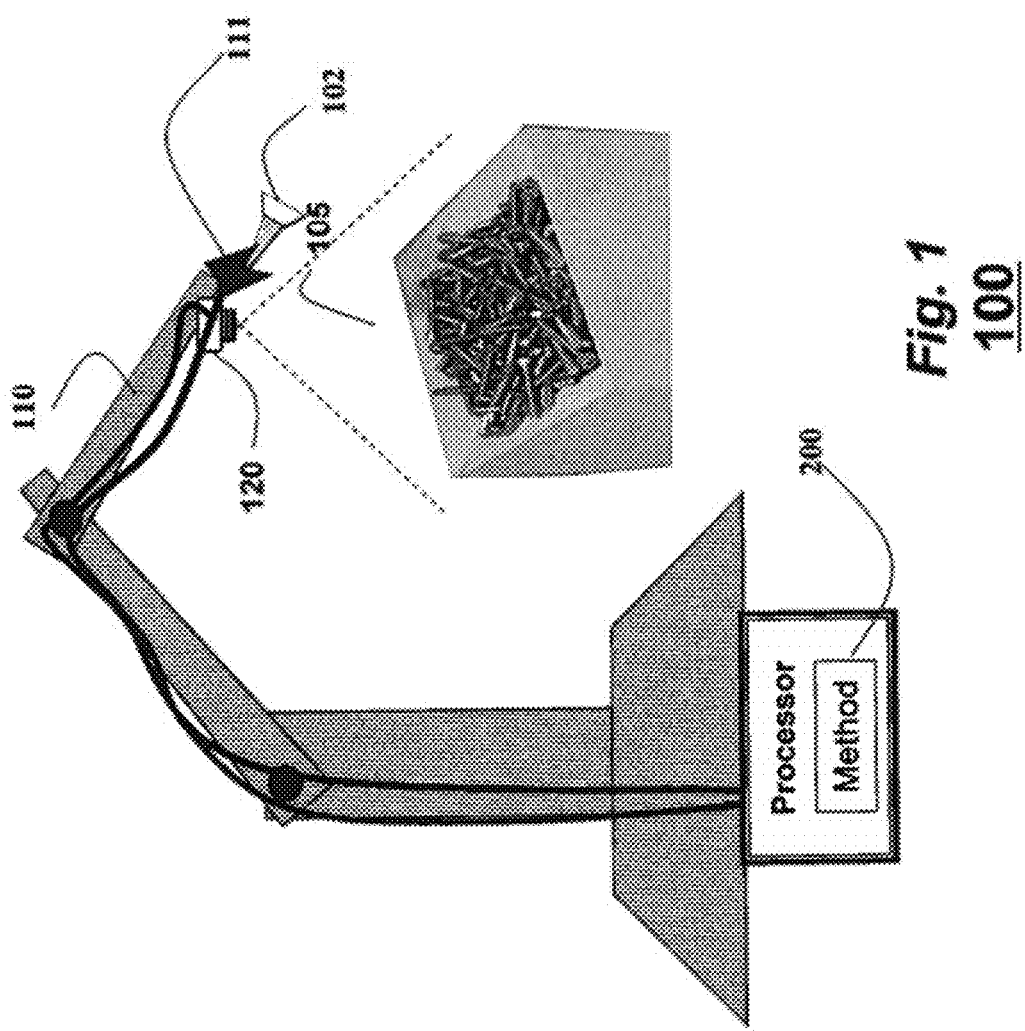
FIG. 1 is a schematic of a system for determining a pose of an object according to embodiments of the invention.

FIG. 1 shows a system 100 and method 200 for determining a pose of an object according to embodiments of our invention. In particular the object is a metallic screw or bolt 102 arranged in a bin 105 of identical screws. For example, the bin contains about two-hundred, 25 mm M4 screws, see ISO 68-1 and ISO 261.

We use a 6-axis industrial robot arm 110, on which a multi-flash camera 120 is mounted. The MFC has multiple point light sources arranged around the lens, and acquires images while illuminating the scene with each light source, see U.S. Pat. No. 7,738,725, incorporated herein by reference.

The MFC is calibrated both internally and externally using a checker board pattern. Gripper to camera calibration is performed so that the robot arm can interact and grasp objects using the gripper.

Figure 2:
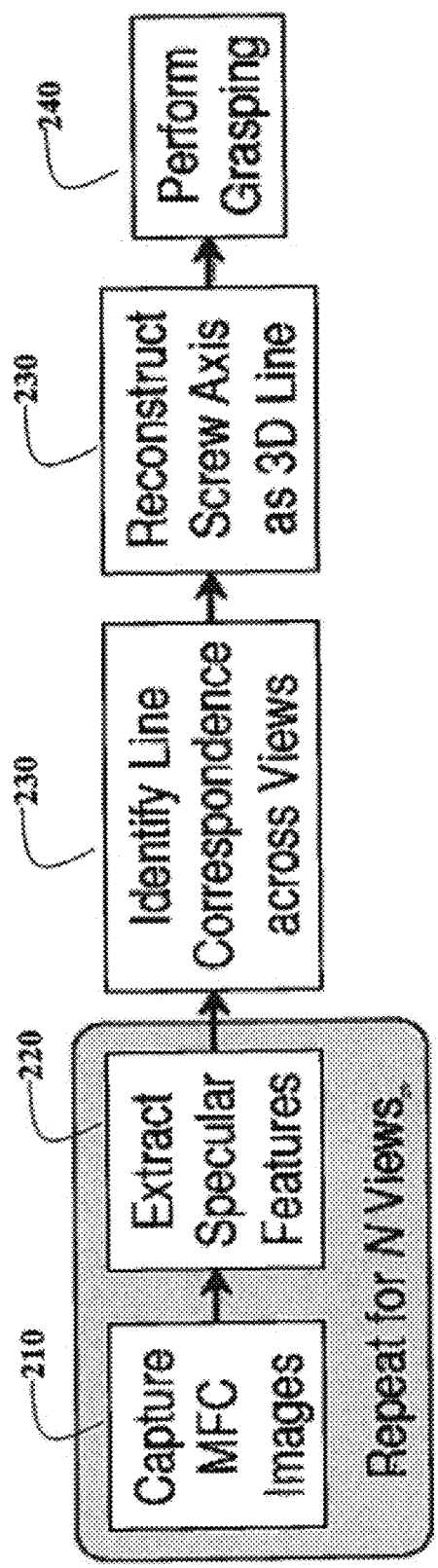
FIG. 2 is a flow diagram of a method for determining a pose of an object according to embodiments of the invention.

FIG. 2 shows the steps of the method 200. The method can be performed in a processor including memory and input/output interfaces as known in the art. We acquire 210 an image of the bin for each of N illumination sources and multiple points of view, and extract specular features. FIG. 2 shows the overview of our method 200.

We identify 230 lines corresponding to the same screw across the images for the multiple points of view, and estimate the pose of a screw by reconstructing 230 a 3D axis of the screw. Then, the gripper grasps 240 the screw using the estimated pose and performs subsequent assembly tasks.

Specular Feature Extraction

Reflection Analysis

Figure 3:
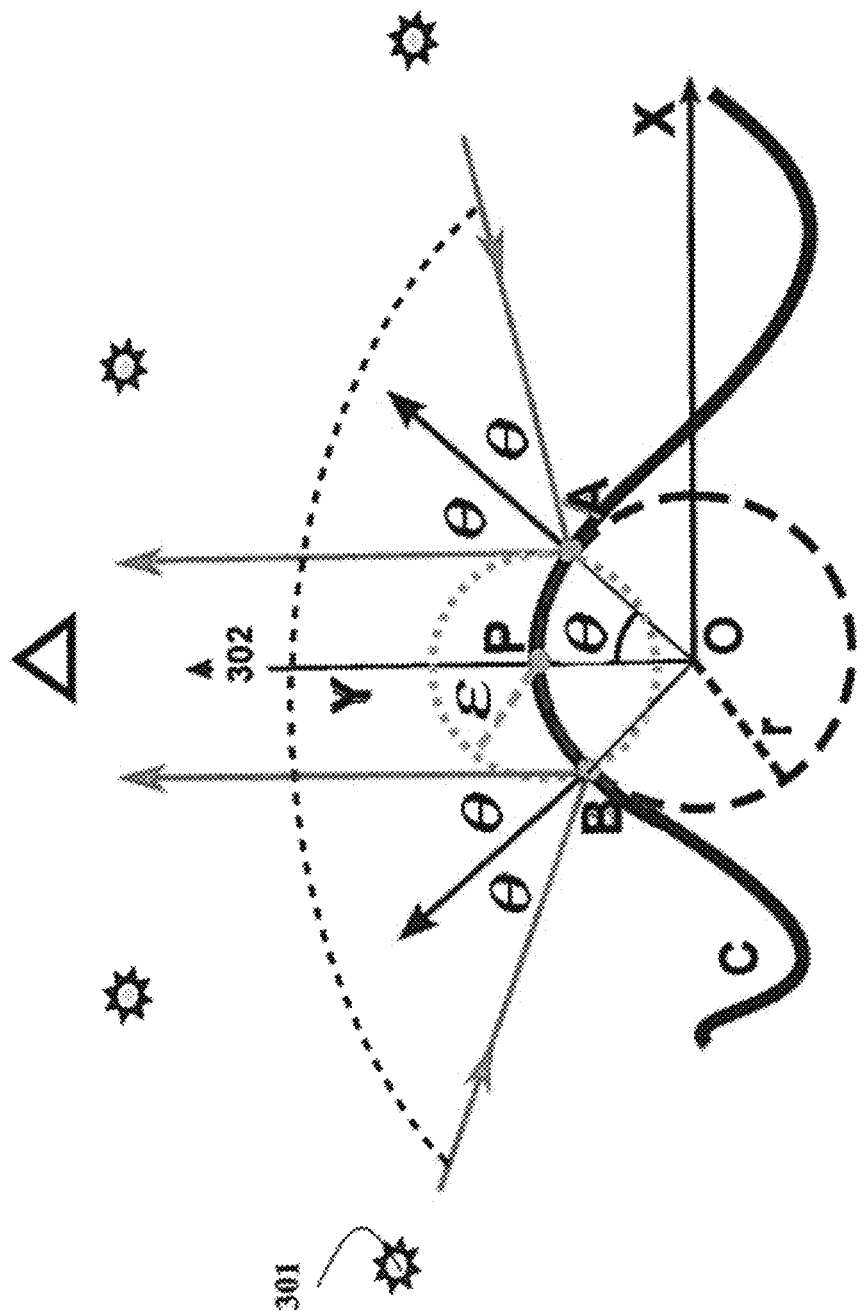
FIG. 3 is a schematic of an analysis of lines reflected from a cylindrical object according to embodiments of the invention.

FIG. 3 schematically shows our analysis for the camera 120 and light sources 301. A point P is arranged on an arbitrary one dimensional curve C. Let r be a radius of the osculating circle at the point P. Then the curvature K at P is $$K=1/r. \tag{1}$$

Consider an $\epsilon$ spherical neighborhood at the point P. If $\epsilon$ is small enough, we assume the curvature in this neighborhood is constant for the purpose of our analysis. We consider two-dimensional coordinate axes with origin as the center of the osculating circle O, Y-axis passing through P, and X-axis orthogonal to T. This $\epsilon$ sphere" meets the curve C at A and B, with $$\theta = 2\sin^{-1}\left(\frac{\epsilon\kappa}{2}\right). \tag{2}$$

Now, consider the ray towards A from a camera on Y-axis. The camera center is at $(0, y_0)$, such that $y_0 \gg \epsilon$. This implies that the ray coming from camera center can be considered parallel to the y-axis 302 as shown in FIG. 3. This ray subtends an angle $\theta$ with the normal at A and is reflected at the angle $\theta$ from the normal.

Symmetrical analysis holds true for the point B. This shows that if the light source is placed anywhere within a cone of $[-2\theta\ 2\theta]$. Then, the camera receives specular reflection from this $\epsilon$ neighborhood. For a fixed cone $[-2\theta\ 2\theta]$, the size of the $\epsilon$ neighborhood is inversely proportional to the curvature of the point, $\epsilon=(2/k)\sin(\theta/2)$, by using a distant camera assumption.

Figure 4B:
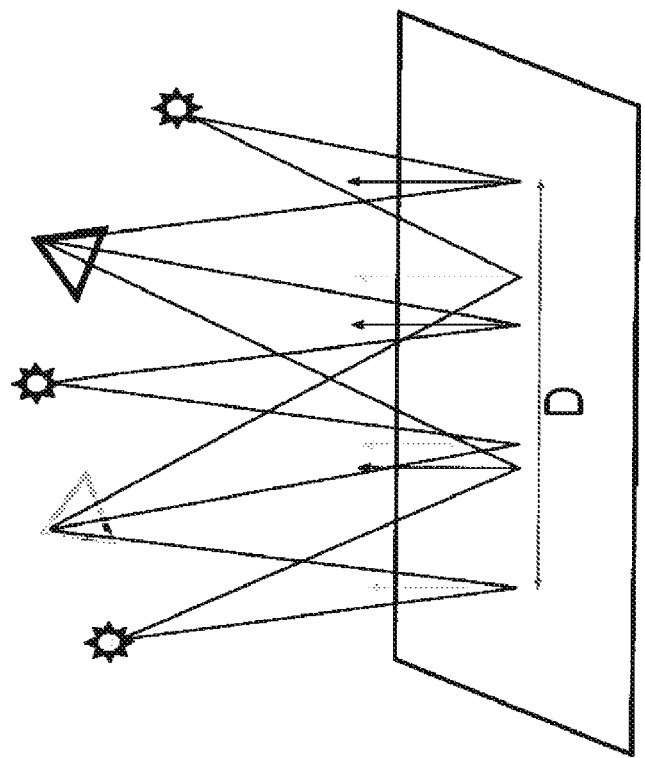
FIGS. 4A-4B are schematics comparing specular highlights at high curvature and low curvature regions.
Figure 4A:
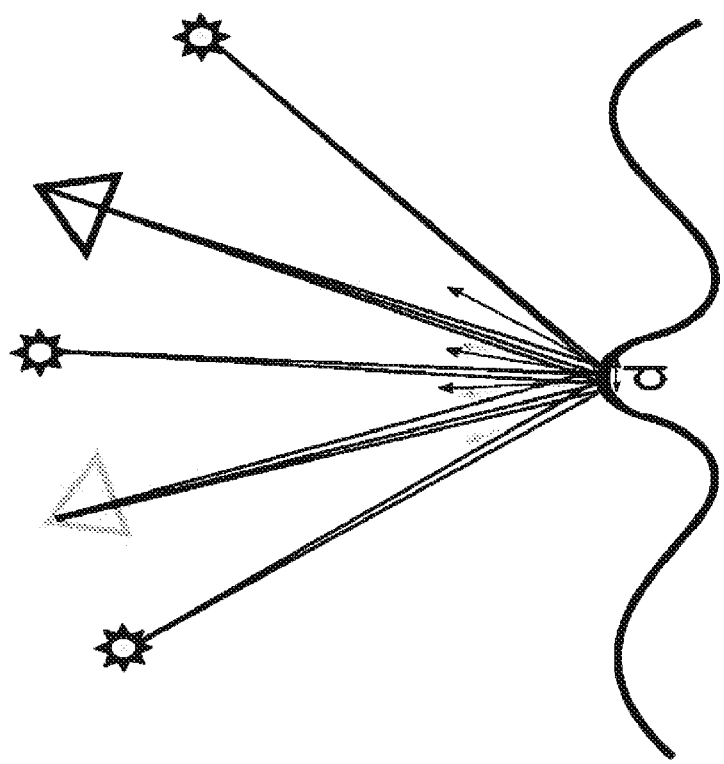

As the curvature increases, the reflections are visible within a small neighborhood of the point, see FIG. 4A. In contrast, when the curve is almost flat, i.e., the curvature is close to zero, the reflection is not visible within the neighborhood of the point, see FIG. 4B. Below, we describe methods that exploit this fact to detect features points on the high curvature regions of the object. This analysis assumes mirror-like reflection. When the specular lobe is considered, this cone of rays can be increased by an additional $2\sigma$, where $\sigma$ is the width of a specular lobe.

The analysis can be extended for a two dimensional surface S. The principal curvatures are defined as the minimum and maximum values of the curvature measured along various directions at a given point. A Gaussian curvature K of a surface is a product of principal curvatures as $$K=k_1 k_2. \tag{3}$$

Similarly, for a two dimensional surface, the reflections are visible within a smaller neighborhood of the point as the Gaussian curvature of the point increases. Both principle curvatures have to be large to observe the reflection within a small neighborhood. For example, a sphere with small radius is a surface with both its principal curvatures large ($k_1=k_2=1/r$) for all the points on the sphere. Therefore, the reflection is visible within a small neighborhood. In contrast, the Gaussian curvature of a point on a cylindrical object is zero because the surface bends only in one direction. Hence, the reflection may not be visible within an immediate neighborhood.

MFC Based Feature Extraction

The feature extraction process determines points on the specular surface that have a large Gaussian curvature, which has bending in both directions, i.e., along both principal curvatures, with normals towards the camera. Although the second requirement seems like a restriction, in fact the high curvature regions span a large set of surface normals. These features provide sufficient information for 3D reconstruction and pose estimation which are described below.

The MFC is an active illumination based camera that contains eight point light sources (LEDs) arranged in a circle around the camera. As the different LEDs around the camera flash, the specular highlights on the surface move depending upon the local curvature. From the analysis above, it is clear that the specular highlights remain in a very local neighborhood for all points that have high surface curvature.

We exploit this cue to detect pixels that correspond to the high curvature regions on the object having normals towards the camera. These pixels serve as a feature that is both characteristic of the 3D shape of the object and its relative pose with respect to the camera.

The steps of our specular feature extraction process are as follows. We acquire eight images corresponding to the eight flashes. This is repeated for three points of view. One image without a flash is also acquired. The ambient image with no flash is then subtracted from each flash image to remove effects of ambient illumination. Thus, there are a total of 25 images (3×8)+1.

An image $I_i$ is acquired, after ambient light subtraction, during the flashing time of the $i^{th}$ LED. A minimum intensity at each pixel in the images $I_i$ are used to construct a minimum illumination image $I_{min}(x, y)=\min_i I_i(x, y)$. The minimum illumination image is similar to a surface albedo. Because the surfaces we are considering are highly specular and the specular highlights move across the images, the minimum illumination image appears to be dark for all the specular regions.

We determine ratio images of the ambient subtracted images to the minimum illumination image, $RI_i=I_i/I_{min}$. Ideally, ratio values in non-highlight regions remain close to one. While the ratio values in regions having a specular highlight is much greater than 1. This information is utilized to detect the highlight regions (specularities) in each flash image.

As described above, with the changing flash positions, specular highlights at high curvature regions stay within a small neighborhood as shown in FIG. 4A, whereas the highlights shift by a large amount in low curvature (flat) regions as shown in FIG. 4B.

We select the ϵ neighborhood, and determine the number of flash images in which a specular highlight are observed within the ϵ neighborhood. For pixels corresponding to high curvature regions, the specular highlight remains within the ϵ neighborhood, and therefore, a specular highlight is observed in all MFC images within this ϵ neighborhood.

For pixels corresponding to low curvature regions, the specular highlights move outside the ϵ neighborhood, and therefore the number of images in which the specular highlight is observed within the ϵ neighborhood is less than eight. Pixels that correspond to Lambertian surfaces are filtered automatically because of normalization with respect to the minimum image.

Pose Estimation

Specular Features on Screws and Bolts

Screws and bolts are generally objects substantially cylindrical in shapes. As defined here, substantially cylindrical includes conic objects as well as any object wherein the circular diameter of the object is substantially smaller than its length, and the object is symmetric about its axis.

As described above, the curvature is in a direction perpendicular to the axis of the object is high, but in the direction parallel to the axis is small. This renders the Gaussian curvature of the object to be small. Let us now consider the effect of adding threads on the surface.

Threads

The threads are typically approximated as a helix (or a conical spiral), provide high degree of curvature to all the points on the object body even in a direction almost parallel to the axis. This ensures that the specular highlights are visible in the ϵ neighborhood independent of the illumination direction. The specular features are extracted as described above.

Figure 4C:
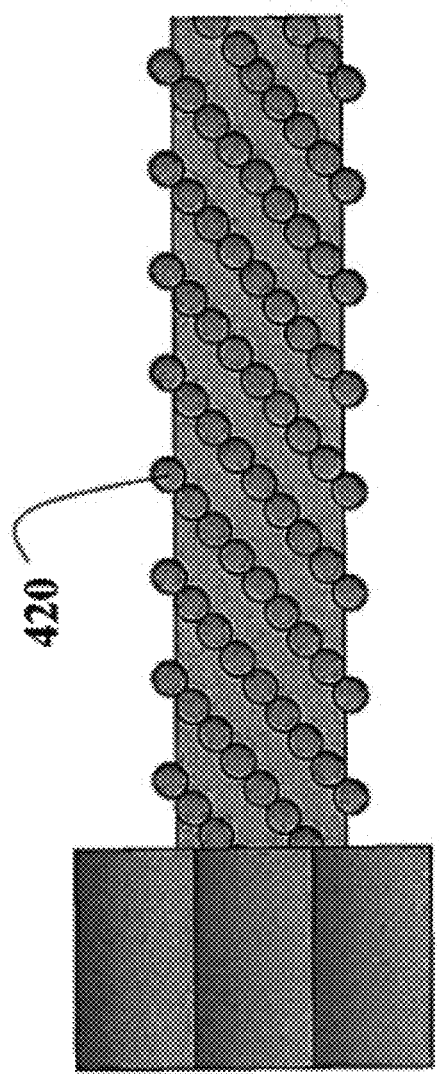
FIG. 4C is a schematic of a bolt with locally spherical regions according to embodiments of the invention.

Thus, the effect of the thread is to make a local region of the screw or bolt appear substantially spherical 420, with a high degree of curvature or a high rate of change of the surface normals. This phenomenon is shown in FIG. 4C. For example, if 180° of curvature are visible over 50 to 10 pixels in an image, the degree of curvature is high, whereas if the curvature is spread over 100 pixels, then the degree of curvature is small.

FIG. 4D further illustrates this effect for a small cross-sectional part of a thread, where $k_1$ and $k_2$ are the principle curvatures, and the region 420 appears spherical.

As shown in FIG. 1, the shape of the screw is substantially cylindrical. As stated above by our definition cylindrical objects include conic objects. The lines 501 on the surface of the cylinder represent the specular feature detected. The value π represents the line formed by these lines with the centers of the cameras $C_1$ and $C_2$. The specular features are detected on high curvature regions having normals directed towards the camera. Approximating the screw shape with a helix, the points on the helix facing towards the camera are arranged along a line. In addition, this line lies on a plane joining a center of the camera and an axis of the screw.

For example, a surface is highly curved if the degree of curvature $$\frac{r}{D} \ll 0.01,$$

where r is a radius of a curved region at a particular point, and D is a distance between a center of the curved region and the camera.

We represent the specular features on the screws with line segments. For parametric shape fitting we use a variant of the well known "RANdom SAmple Consensus" (RANSAC) method. RANSAC is an iterative method to estimate parameters of a model from a set of observed data, which contains outliers. It is a non-deterministic and produces a reasonable result with a certain probability based on the number of iterations.

The RANSAC method initially hypothesizes a variety of lines by selecting a small subset of points and their directions. The support of a line is given by the set of points which satisfy the line equation within a small residual and form a continuous structure. The line segment with the largest support is retained and the procedure is iterated with the reduced set until the support becomes smaller than a few points. The RANSAC method provides inlier points for each line segment. Then, we refine each line segment using least square estimation on the inlier points.

Pose Estimation

Figure 5:
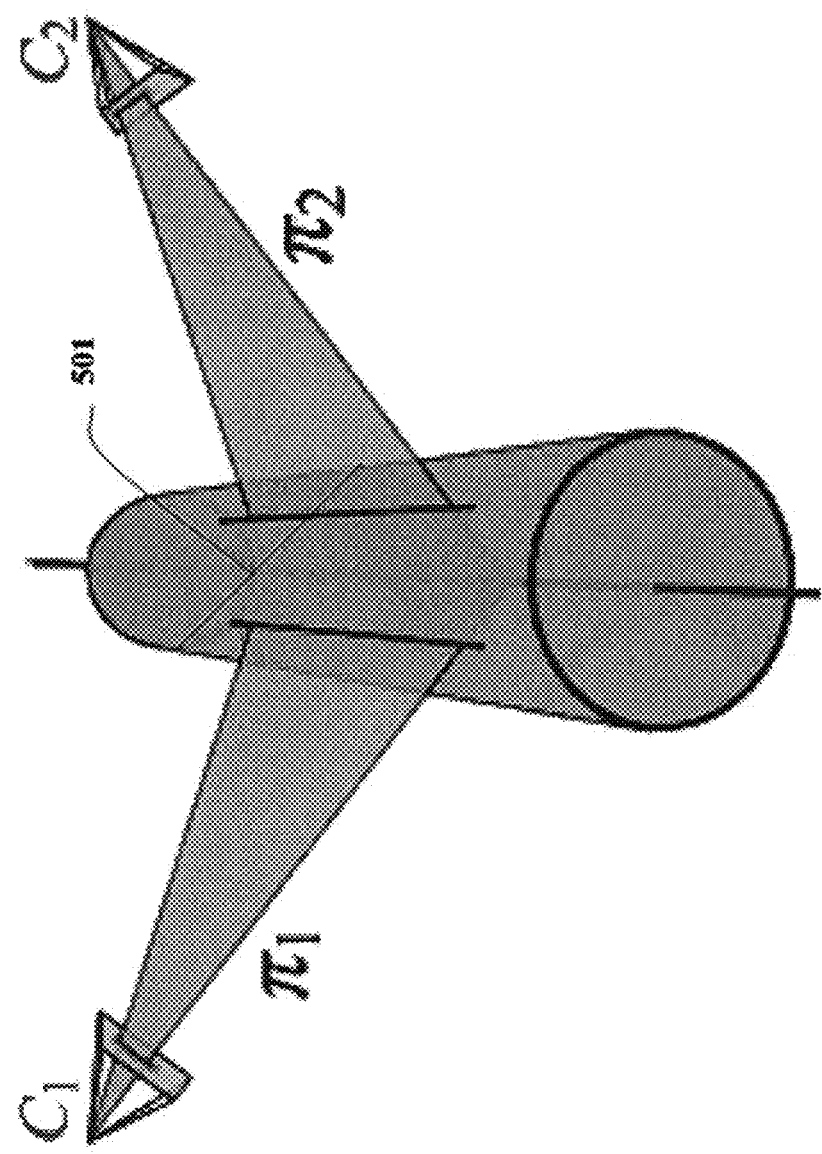
FIG. 5 is a schematic of detected specular line segments on a plane joining a center of projection of a camera, an axis of a screw according to embodiments of the invention.

To estimate the pose of a screw, we reconstruct the 3D line corresponding to the axis of the screw, which uniquely determines the position and orientation (pose) of the screw. We determine the specular features from multiple camera points of view. As above, the detected specular line segments lie on the plane $\pi_i$ joining the center of projection of the $i^{th}$ camera, and the axis of the screw as shown in FIG. 5. The reconstruction of the 3D line corresponding to the axis of the screw is given by the intersection of these planes.

3D Line Reconstruction Using Three Points of View

Correspondences between a 3D parametric line and its corresponding projections in images acquired for multiple points of view are well known. We apply geometric constraints to the line (parametric shape) to determine lines corresponding to the same screw across three points of view, and to reconstruct the 3D line.

Geometry of Line Projection

Consider a line L in 3-space, which is imaged in three points of view. Let $l_i$ be a projection of L in view i and $P_i$ be the projection matrix of view i. Using the projection matrix, an image point can be back-projected to a ray passing through the camera center in a world coordinate system. Both endpoints of the line in the image plane can be back-projected as individual rays. Alternatively, the back projection of an image line $l_i$ corresponds to a plane in view i as $\pi_i$ $$\pi_i \equiv A_i X + B_i Y + C_i Z + D = 0 \qquad (4)$$

where A-D are arbitrary constants.

Determining Correspondences

Because there are multiple screws in the bin, we need to identify the lines corresponding to the same screw from different points of view. We use a property that three arbitrary planes do not generally meet at a single line to obtain our correspondences. This geometric intersection constraint is expressed by the requirement that a 4×3 matrix defined by the coefficients of three planes $$\begin{pmatrix} A_i & B_i & C_i & D_i \\ A_j & B_j & C_j & D_j \\ \underbrace{A_k \quad B_k \quad C_k}_{A} & \underbrace{D_k}_{b} \end{pmatrix} \qquad (5)$$

should have rank two. This geometric constraint is satisfied if the determinants of four 3×3 sub-matrices of Equations (5) are zero. In practice, due to noise in image measurements even for lines in correspondence, the determinants of these sub-matrices are not zero but small. Therefore, we determine the sum of the four determinant values for each triplet of lines as the correspondence cost, and select the minimum cost.

Reconstruction of the 3D Line

After determining the three lines corresponding to the same screw, we determine the 3D line passing through the axis of the screw. The line equation in 3D is $$X = X_0 + \lambda X_1, \quad (6)$$

where $X_0$ is a point on the line and $X_1$ is the direction of the line. The direction of the line is determined as being perpendicular to all the plane normals if possible. This can be obtained by solving $AX_1 = 0$. The optimum solution, in a least squares sense, is given by the right singular vector corresponding to the smallest singular value of matrix A. We select $X_o$ as the point which is closest to the three planes. This point can be found via the least squares solution of $AX_0 = -b$.

Degenerate Configurations

If two planes are close to being parallel, the rank of the matrix in Equation (5) is close to two, regardless of the other plane, leading to difficulty in determining correspondence. Therefore, we ignore such pairs of planes by checking the angle between the normals of the two planes. This primarily happens when the axis of screw is aligned with the translation between two camera positions. If we randomly select three camera viewpoints, all three translational directions between camera pairs become degenerate directions. To avoid this, we move the camera on a straight line so that there is only a single degenerate direction. In addition, we change this direction of motion to handle screws with varying poses during subsequent picking.

3D Line Reconstruction Using Two Points of View

Because two non-degenerate planes from two points of view always intersect on a line, determining correspondences using two points of view is typically difficult. However, the correspondence can be determined if we assume that the 3D lines are located around some plane in the world coordinate system.

Therefore, we use the $Z = Z_0$ plane, together with the two viewing planes, and determine the correspondence cost in the same way as the three view case. This cost favors screw whose Z position is close to $Z_0$, and whose angle is close to horizontal. After determining the correspondence, we reconstruct a 3D line as the intersection of two viewing planes without using the $Z = Z_0$ plane.

Position Estimation

After reconstructing the 3D line using Equation (6), we determine the segment of the line corresponding to the screw by back-projecting the end points of 2D lines in each view, and determining the intersection point between the back-projected viewing ray and the reconstructed 3D line. We further validate the reconstructed line segment by comparing the length of the reconstructed line segment with the physical length of the screw. The center of the line segment is selected as the 3D gripping position.

Finally, we determine the end point of the line segment corresponding to the head of the screw. We first determine the maximum images in all the points of view which are simply a pixel-wise maximum over the eight images. The head of the screw is a smooth region with relatively lower curvature compared to the screw body. Therefore the specular highlights on the screw head moves in a larger neighborhood with the alternating flashes producing brighter patches in the maximum image compared to the screw tail.

EFFECT OF THE INVENTION

The invention can be used to determine the pose of specular objects. Regions of high curvature in the highly specular objects produce specular reflections largely independent of the position of the illumination sources, which can be used as distinct features for object detection and pose estimation.

We use an inexpensive multi-flash camera to reliably detect such specular features. We use screws as an example part and develop two view and three view based methods for pose estimation using triangulation. The method if implemented for an industrial robot, and has a very high position and angular accuracy for 3D pose estimation.

We do not treat specularities as noise, but rather as a feature that can and does enhance our ability to detect, recognize and interact with specular objects. For regions of high curvature on a specular object, this lead to a very consistent and robust feature that can be used to reliably perform machine vision tasks.

Because high curvature regions in an object have normals that span a wide angular extent, these regions almost always produce specular reflections irrespective of the lighting position. The detection of these specular reflections serve to indicate regions of very high curvature on the surface of the object.

The use of a multi-flash camera aids in the detection and extraction of these specular features. These high curvature regions provide a distinct signature for industrial objects, which can be used for object detection, recognition and pose estimation.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a pose of an object, wherein the pose is a position and orientation of the object, wherein the object is specular, comprising:

acquiring a plurality of sets of images of the object with a camera, wherein the object has a curved region, wherein a degree of curvature of the curved region is $$\frac{r}{D} \ll 0.01,$$

where r is a radius of the curved region at particular points and D is a distance between a center of the curved region and the camera, and wherein the camera is at a different point of view for each set of images, and wherein each image in each set is acquired while the scene is illuminated from a different direction;

extracting a set of features from each image, wherein the features correspond to the particular points on the curved region having normals towards the camera;

fitting a parametric shape to the particular points for each image; and applying geometric constraints to the parametric shape, to determine the pose of the object.

2. The method of claim 1, wherein the camera is arranged on an arm of a robot, and further comprising:

gripping the object according to the pose.

3. The method of claim 1, wherein the camera has a set of point light sources arranged around a lens.

4. The method of claim 3, wherein the illumination is from the set of point light sources, and each set of images include an ambient image acquired with ambient light, and further comprising:
   subtracting the ambient image from each other image in the set;
   determining a minimum illumination image after the subtracting; and
   determining a ratio image from the minimum illumination image to detect specularities.

5. The method of claim 1, wherein the object is arranged in a bin with a plurality of identical objects.

6. The method of claim 1, wherein a curvature K at the particular point is k=1/r, where r is a radius.

7. The method of claim 6, wherein the curvature is Gaussian and a product of principal curvatures $k_1 k_2$.

8. The method of claim 1, wherein the object is a screw, and the curved region corresponds to a conical and spiral-shaped thread.

9. The method of claim 1, wherein the object is a bolt, and the curved region correspond to a helical thread.

10. The method of claim 1, wherein the parametric shape is a line, and the line lies on a plane joining a center of the camera and an axis of the object.

11. The method of claim 1, wherein the fitting uses a variant a RANdom SAmple Consensus method (RANSAC).

12. The method of claim 1, wherein the geometric constraints are rank two constraint arising from a dependency of three planes intersecting in a line is used to determine the pose of the object.

13. A system for determining a pose of an object, wherein the pose is a position and orientation of the object, wherein the object is specular, comprising:
   a camera for acquiring a plurality of sets of images of the object, wherein the object has a curved region, wherein a degree of curvature of the curved region is $$\frac{r}{D} \ll 0.01,$$

where r is a radius of the curved region at particular points and D is a distance between a center of the curved region and the camera, and wherein the camera is at a different point of view for each set of images, and wherein each image in each set is acquired while the scene is illuminated from a different direction;
   means for extracting a set of features from each images, wherein the features correspond to the particular points on the curved region having normals towards the camera;
   means for fitting a parametric shape to the particular points for each image; and
   means for applying geometric constraints to the parametric shape, to determine the pose of the object.

14. The system of claim 13, wherein the object is arranged in a bin with a plurality of identical objects.

15. The system of claim 13, further comprising:
   an arm of a robot, wherein the camera is arranged on the arm; and
   comprising: and
      means for gripping the object according to the pose.

* * * * *